June 25, 1968 R. S. KEYES Re. 26,413

FORMING METHOD

Original Filed Dec. 18, 1961 2 Sheets-Sheet 1

INVENTOR.
RAYMOND S. KEYES
BY Price & Heneveld
ATTORNEYS

INVENTOR.
RAYMOND S. KEYES
BY Price & Heneveld
ATTORNEYS

United States Patent Office

Re. 26,413
Reissued June 25, 1968

26,413
FORMING METHOD

Raymond S. Keyes, Kalamazoo, Mich., by Kirkhof Manufacturing Corporation, Grand Rapids, Mich., a corporation of Michigan, assignee Original No. 3,190,946, dated June 22, 1965, Ser. No. 356,348, Mar. 13, 1964, which is a division of Ser. No. 160,057, Dec. 18, 1961. Application for reissue June 27, 1966, Ser. No. 615,856
(Filed under Rule 47(b) and 35 U.S.C. 118)
4 Claims. (Cl. 264—89)

Matter enclosed in heavy brackets [ ] appears in the original patent but forms no part of this reissue specification; matter printed in italics indicates the additions made by reissue.

*ABSTRACT OF THE DISCLOSURE*

*A method of forming separate, individual, three-dimensional, plastic articles from a generally continuous plastic web or sheet by first forcibly forming the articles into the web, preferably by pressing a peripheral blade into peripheral sealing engagement with the web and applying a pressure differential across the web within the confines of the blade, when the web is heated, then pressing the peripheral blade further into the web around the article to crease it but not sever it, then conducting the cooling web and article in a non-linear path to break the brittle crease at the front edge of the article while introducing a separating surface between the front edge of the article and the web to break the article completely out of the web.*

This application is a divisional application of the parent application entitled Forming Press filed December 18, 1961, Serial No. 160,057 by Raymond S. Keyes and assigned to Kirkhof Manufacturing Corporation.

This invention relates to a method for forming plastic articles by die-forming techniques, especially from sheet plastic material.

The formation of plastic containers, toys, novelties, and other similar articles from plastic sheets by die-forming techniques is ever in need of more rapid, more reliable and more automatic apparatus and methods. These should produce articles of relatively uniform thickness, should be capable of deep drawing the articles, should be adaptable to high speed automation production techniques, and should be amenable to multiple article formation per press stroke.

In many instances today, present equipment simply cannot produce enough articles per unit of time to economically justify the expense of the forming apparatus. The multiple step process normally used necessitates one apparatus for die forming and a completely separate apparatus to sever the formed article from the surrounding sheet. In some equipment available today, cutting dies have been incorporated into the forming press. The formed articles are thus cut loose from the sheet while still inside the press. These articles must therefore be individually removed, and have a tendency to remain in the press and jam the following stroke. Further, the number of articles which can be formed per press stroke in a press having the cutter blades therein is somewhat limited since the larger the number of articles, the more complex the removal mechanism becomes. Further, with this latter type of apparatus, either the knife or the conventional hold-down plate must be mounted at least semi-independently of the moving platen thereby introducing more mechanism to increase failure down-time probabilities.

Another limitation with present forming equipment is that die-formed containers almost invariably have a flat generally horizontal peripheral surface due to the action of the hold-down plate thought to be so necessary to hold the plastic sheet during formation. This flange limits the design of a container top closure unless special steps are taken to trim the flange on each individual container.

Present apparatus also involves a limitation with respect to heating speed and uniformity. One of the most advantageous and rigid forming techniques is centered around the hot plate or hot surface method wherein the sheet is first forced against the hot surface by a pressure differential, and then is forced onto the die surface by a reverse pressure differential. Although the resulting conduction heating is fairly rapid, the sheets are heated only on the bottom side, and thus valuable production time is consumed while the heat penetrates to the opposite side of the plastic sheet. Even then, a temperature differential is bound to exist across the sheet to limit its drawing amenability.

It is therefore an object of this invention to provide a forming method capable of extremely high production rates due to increased production speed possible. It enables the economic production of plastic hollow articles for many uses where such were not competitive in price heretofore. No separate apparatus is required to sever the formed article from the sheet. Further, no individual articles are cut loose from the sheet in the forming press to jam it.

It is another object of this invention to provide a forming method capable of conditioning the formed articles to enable their rapid, inexpensive, and complete separation from the sheet after the articles are conveyed away from the press, but not before.

An object of this invention is to provide a novel method of forming plastic articles from a sheet by the hot plate technique wherein both surfaces of the sheet are heated prior to die formation to thus achieve more rapid as well as uniform heating. In the novel process the sheet is held and sealed during the first stage of the process in a novel manner while die forming occurs, is then conditioned by creasing for separation of the articles during the second stage, and is then removed from the forming apparatus as the joined sheet and articles in a predetermined path to cause automatic separation of the articles from the sheet.

These and other objects will be apparent upon studying the following specification in conjunction with the drawings in which.

The device shown comprises a forming apparatus including die forming means, and a peripheral protuberance or dull narrow blade around each portion of the die forming a separate article. The protuberance serves the multiple purpose of holding and sealing the plastic sheet during die-forming, and of peripherally creasing the sheet around each formed article to condition the plastic and thereby allow the article or shell to be readily peeled or broken out of the sheet along the crease when cooled. In the press a toggle linkage is used to obtain the required force. The upper platen is lowered by a dual power cylinder in two successive stages or movements to sequentially effect the holding and sealing and then the creasing. A stabilizer linkage associated with the toggle linkage effectuates uniform pressure between the platens, both when the toggle linkage is non-linear in the first or sealing stage, and when the links of the toggle linkage are co-linear during the second or creasing stage.

Uniform sheet heating on both sides is effected by a combination of hot surface contact on one side and hot pressurized air on the other, which air also serves to help supply pressure differential holding the sheet in contact with the hot surface.

The apparatus includes a sheet transfer mechanism to move the sheet and conditioned articles as a unit out of the forming press and in a non-linear path causing ejection of the formed articles from the sheet. It includes a pair of friction rollers, one of which has a one-way clutch, and a reciprocating belt or chain operatively connected to the clutch and reciprocated by a power cylinder, the piston of which forms part of the chain.

In the method of forming the plastic articles, portions of the sheet are heated and then forced against a die surface while the peripheral edge thereof is held and sealed on a narrow peripheral band with a dull blade. Then the periphery is creased along the band by increased pressure on the blade. The sheet and articles are then shifted out of the forming press and conducted in a non-linear arcuate path. This path causes the front of the relatively rigid article to break out of the flexible sheet, thereby allowing the entire article to be peeled from the sheet by introducing a surface between the front of the article and the sheet.

Figure 2:
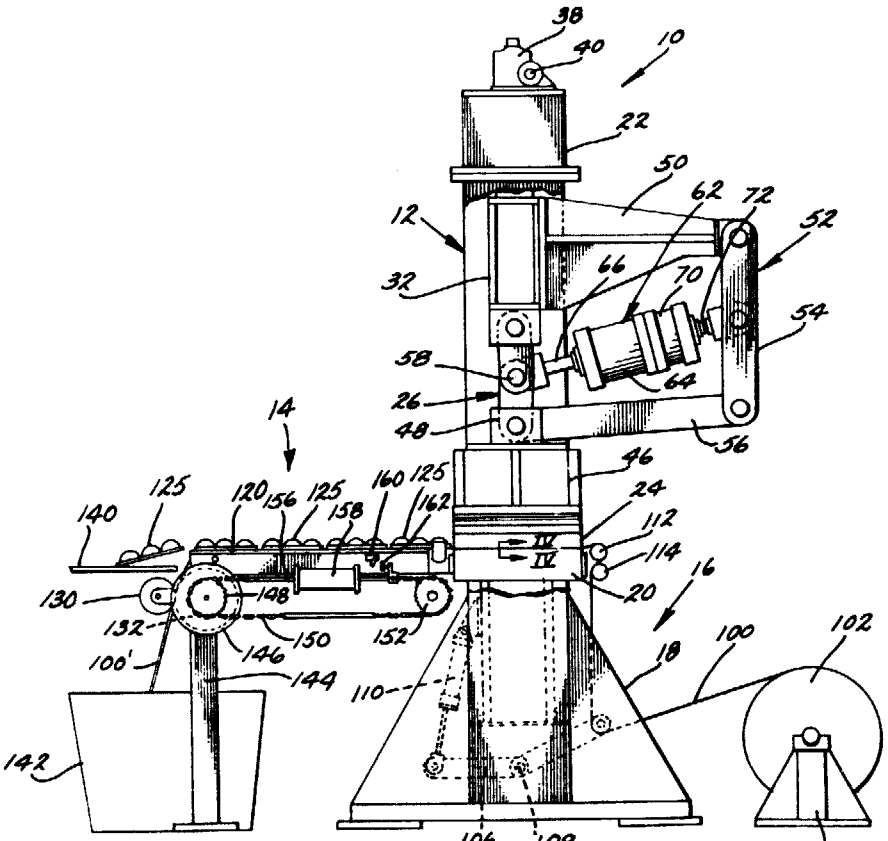
FIG. 2 is a side elevational view of the forming apparatus in FIG. 1 and showing sheet transfer mechanism.
Figure 1:
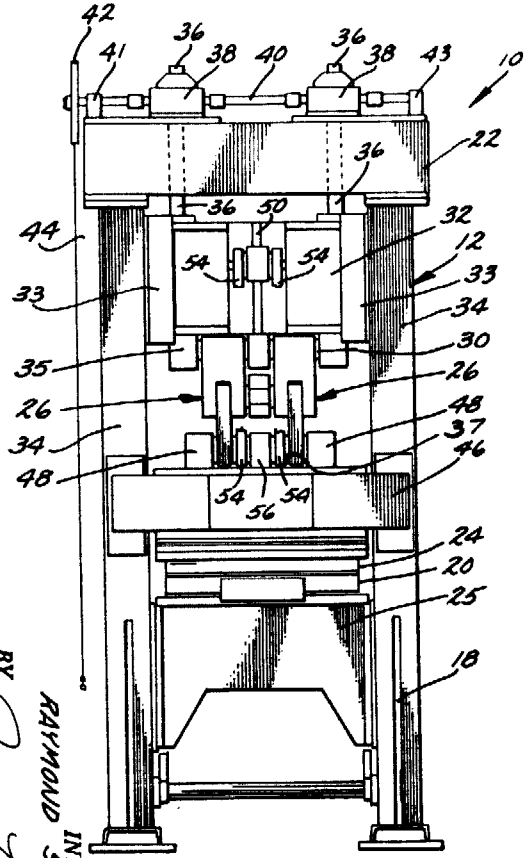
FIG. 1 is an elevational view of the back of forming press apparatus useful in practicing the novel method.

The invention in its entirety will be understood more clearly by reference to the drawings. In FIGS. 1 and 2, the complete forming apparatus 10 is shown including a forming and creasing press 12, a transfer and separation mechanism 14, and a sheet stock feed mechanism 16.

Press 12 includes a base 18, a pair of lateral uprights 34, and a cross head 22. Adjustably mounted to cross head 22 is a ram support 32 slidably movable in guides 33 on lateral supports 34. Ram 46 is suspended beneath ram support 32 with a pair of toggle linkages or joints 26. The upper end of the upper link of each joint is pivotally mounted to shaft 30 journaled in bearing blocks 35 on the ram support. The lower end of the lower link of each joint is pivotally mounted to shaft 37 journaled in bearing blocks 48 on the ram 46. Ram 46 includes an upper platen 24 having a die surface therein. A lower platen 20 is mounted on the bed 25 supported by the base of the press.

The vertical position of the ram support 32 and thus the ram 46 may be adjusted by a pair of screws 36, the upper ends of which are rotatably held in gear housing 38. Shaft 40 suspended in pillow blocks 41 and 43 is rotatable by chain 44 and sheave wheel 42 to thereby revolve screws 36 to raise or lower the ram support 32.

Extending laterally from and mounted securely to ram support 32 is a cantilever supporting arm 50. Link 54 is pivotally mounted to arm 50 and depends therefrom. Link 56 is pivotally connected to the lower end of link 54 at one end, and at its other end to the pivotal connection between the toggle linkage and the ram 46. Operably positioned between the intermediate portion of link 54 and the knee 58 of the toggle joints 26 is a dual or piggy-back fluid power cylinder 62 of the reciprocating piston type. This motor includes a first cylinder 64 having a piston 66 mounted to knee shaft of the toggle joint, and a second cylinder 70 backed up to the first and having piston 72 mounted pivotally to link 54 intermediate its ends. By operation of these two air cylinders successively, the press is closed in two stages with extension of the toggle joints. These toggle joints enable great pressures to be applied between the platens.

A plurality of forming dies are possessed by the upper platens to form a plurality of articles with each press stroke. The particular configuration of dies may be widely varied depending upon the article to be formed. One section of such a die capable of forming a shell type article is illustrated in FIGS. 3 through 6. Associated with the cavities thereof are conduit means 80 connectable to both a vacuum line and an air pressure line (not shown). The lower platen 20 is preferably formed of a porous sintered metal or drilled plate to allow air passage therethrough. This enables the area underneath the plastic sheet to be readily evacuated and also simultaneously causes the surface of the lower platen to present a continuous hot surface. Heat is provided with a suitable means such as electrical resistance heater 82.

Extending between the lower and upper platens is a peripheral protuberance or dull but narrow blade 84 which extends around the entire periphery of each of the several die surfaces in the platen. This dull blade serves as a holding means, a sealing means, and a creasing or conditioning means as will be explained more fully hereinafter. This blade may be secured to the upper platen by a press fit or in any suitable manner.

A sheet material feed-in mechanism 16, for unrolling the plastic sheet portion 100 from the roll 102 mounted upon a suitable stand 104, includes rocker arm 106 pivotally mounted at 108 intermediate its ends. It is operated by a fluid cylinder 110 mounted to the base of the press. Reciprocation of the cylinder piston thus pivots arm 106 about point 108 to pull portions of sheet 100 from roll 102. This occurs when the platens of the press are closed so that the slack can only come from the roll and cannot be pulled backwardly through the press. A suitable pair of guide rollers 112 and 114 direct the sheet 100 into the press.

The transfer mechanism 14 for removing the sheet with its formed articles from the press is intermittently driven and operates when the press is open. The sheet and the formed and peripherally creased articles when emerging from the press pass along a suitable support table 120. It is supported adjacent the press bed at one end and on legs 144 at the other end. The formed articles 125 emerging from the press are still integral with the sheet 100. Mounted beneath the outer end of the table so as to pull the sheet in a non-linear (preferably arcuate) path over the end of the table are a pair of friction rollers 130 and 132. Roller 132 includes a one-way clutch 146 mounted on one end thereof. The one-way clutching means may be of any conventional type to cause positive engagement driving of the roller in one direction, here the counterclockwise direction, and slippage in the opposite direction. Affixed to the clutch 146 is a sprocket 148 for chain 150 which also passes round the idler sprocket 152. Forming a portion of this chain connection is a piston 156 of a fluid power cylinder 158. The chain may be substituted by another belt-type element if desired. Reciprocation of the piston causes the chain to be reciprocated to drive the sprocket 148 and thus the one-way clutch and the rollers to pull sheet 100. A suitable stop switch 160 mounted to table 120 is actuated by stop 162 on the chain to limit the travel of the chain. The air cylinder is then reversed before the next stroke. The formed articles are separated from the sheet 100 on this arcuate path in a manner to be explained hereinafter so that articles 125 pass onto a suitable receiving surface 140 while the remaining sheet scrap 100' passes through the rollers and into a container 142. The scrap may be cut up for re-use before being placed in the container if desired.

Operation

When it is desired to form a plurality of shell-type articles, the upper platen with the desired die surface is mounted to the ram 46 for reciprocation therewith. Plastic sheet 100 is then fed manually through the press and inserted between the friction rollers 130 and 132. Lower platen 20 is then pre-heated as by resistance element 82. The press is then started into operation by making suitable pressurized fluid line connections to cylinders 64 and 70 of the piggy-back motor 62, and to fluid cylinders 158 and 110 for the sheet handling mechanisms. Suitable solenoid valves and timers may be used to operate the cylinders in the sequence set forth below. Fluid cylinder 64 is then actuated to extend piston 66. This moves the toggle links of the joints 26 from a position forming an acute angle with each other to a position with the links almost co-linear, but not quite, so that a small lowering of the upper platen is still possible by pushing the links to the co-linear position. This places dull blade 84, around the periphery of each of the individual article dies, in holding and sealing contact with the plastic sheet 100 against the surface of lower platen 20 (see FIG. 5). Since the toggle joint is not completely extended with this first movement, the force on the ram is axial to the lower link of the toggle and is thus at an acute angle to the vertical movement of the ram. Since this force would normally have a horizontal force component, it would normally cause an unbalanced piston pressure with a greater pressure on the side of the ram opposite the power cylinder 62 than on the adjacent side. The stabilizer linkage of the novel apparatus, including arm 50 and links 54 and 56, neutralizes this horizontal force component of the lower toggle link and thus achieves a balanced pressure by all portions of the upper platen. The only force applied is a vertical downward pressure. This is very important since an unbalanced pressure during the forming stage could cause the blade to sever the plastic sheet on one side, and enable the sheet to slip and not seal properly on the other side. During the second stage, the blade with unbalanced pressure would almost certainly sever the sheet on one side, and would not properly crease the sheet on the other side. The space between the sheet 100 and the lower platen 20 is then evacuated through the porous material forming the lower platen. Simultaneously, hot air is injected into the conduit means 80 associated with each of the concave female die portions above the sheet to further increase the pressure differential across the sheet, thereby causing a firm contact between sheet 100 and the heated lower surface and also causing heating of the upper surface of the sheet 100 simultaneously with heating of the lower surface. The sheet is thus uniformly and rapidly heated.

Figure 3:
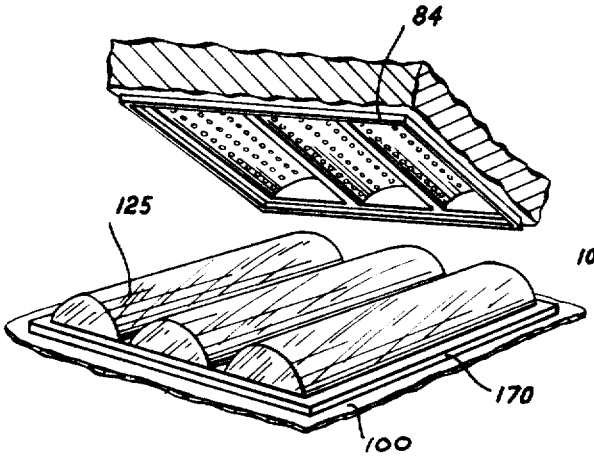
FIG. 3 is a perspective view of a formed plastic article and its forming die which comprises a portion of the several dies in the apparatus illustrated in FIGS. 1 and 2.
Figure 4:
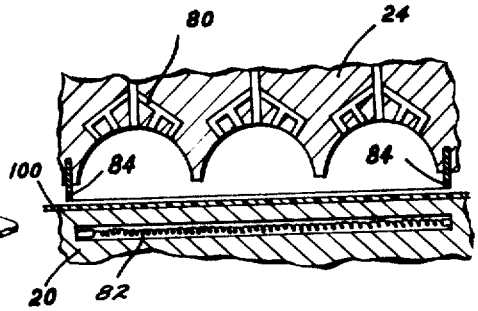
FIG. 4 is a sectional elevational view of a portion of the platens of the press taken on plane IV—IV in FIG. 1 and showing the beginning of the process.
Figure 5:
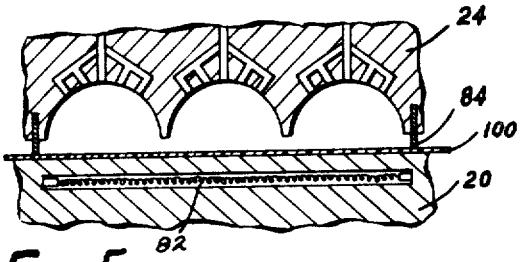
FIG. 5 is an elevational sectional view of the platens in FIG. 4 in the next process step when the plastic sheet is sealed therebetween.
Figure 6:
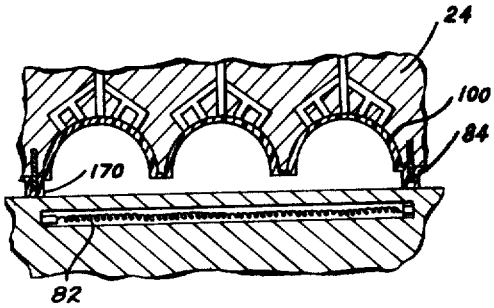
FIG. 6 is an elevational sectional view of the apparatus in FIGS. 4 and 5 after the forming step of the process.
Figure 7:
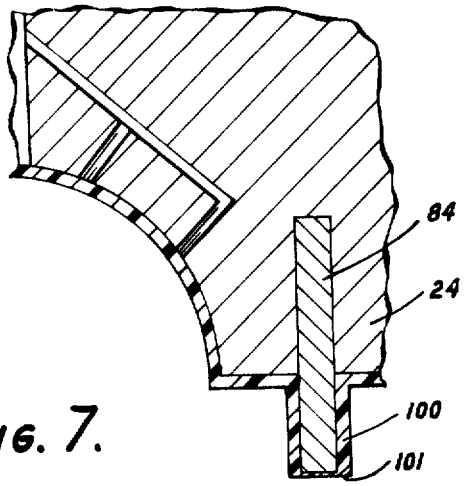
FIG. 7 is an enlarged fragmentary elevational view of a portion of the apparatus illustrated in FIG. 6, showing the conditioning of the plastic material.

As soon as the plastic sheet is heated, the pressure differential is reversed by evacuating the space between the sheet and the upper platen and injecting pressurized air beneath the sheet and the lower platen. This draws the heated sheet and forces it to conform to the die surface (see FIG. 6). The inner side of the blade 84 forms a portion of the die surface so that the peripheral edge of the container comprises a vertical surface 170 as shown in FIGS. 3, 6 and 7. This surface may be lengthened or shortened by using a longer or shorter blade.

As soon as the plastic sheet has been forced into the die cavities, fluid cylinder 70 is actuated to force the toggle joint into the full co-linear position, at which time the ram and upper platen are lowered the maximum amount for the particular ram support adjustment chosen. This lowers the ram, the upper platen and the blade only a small but definite increment to force the blade 84 into the peripheral edge of the plastic sheet article as illustrated in FIG. 7. The pressure is again uniform over the entire area since only a vertical force is applied by the now vertical co-linear toggle links. The peripheral protuberance thereby creases the periphery of each of the adjacent articles but leaves a thin layer of plastic a few thousandths of an inch thick at 101 beneath the blade around each article. The heated compressed crease is thereby cured sufficiently to make it brittle when cooled. This creasing action does not sever the formed articles from the sheet, but only conditions them for easy removal in a manner to be explained.

Thereafter, power cylinders 64 and 70 are reversed to bend the toggle joints by retracting their knees 58 to open the press.

As the press opens, fluid cylinder 158 is actuated to shift piston 156 and thus chain 150 to rotate one-way clutch 146 counterclockwise to rotate roller 132 against roller 130. This pulls sheet 100 and the [forward] *formed*, peripherally creased articles around the edge of the table 120 in a non-linear substantially arcuate path. As the articles reach the end of the table the thin creased areas have cooled and become somewhat brittle. Since the article possesses an inherent stiffness due to its now complex configuration as opposed to the sheet which is highly flexible, the article tends to assume a straight line path whereas the sheet readily follows the non-linear path. The front end of the article therefore breaks out of the sheet and catches onto surface 140 to peel the moving articles from the sheet as the remainder of the sheet scrap 100' repeatedly passes between rollers 130 and 132. This scrap may be cut up or otherwise suitably placed in a container 142 to be reprocessed as needed. Each time the press is closed, arm 106 is pivoted to pull more sheet plastic from roll 102. Each time the press opens, transfer mechanism 14 pulls the formed articles and adjacent sheet scrap out of the press. This operation is continuously repeated. Since the articles 125 are not cut loose in the press but are creased for simple and easy removal after exit from the press, a very large number of such articles may be formed during each press stroke without danger of jamming it.

It will be obvious to those having ordinary skill in the art that the features disclosed may be modified in various ways without departing from the scope and spirit of [the] *this* invention. Such modifications are deemed to be a part of this invention which is to be limited only by the scope of the appended claims and the reasonably equivalent structures and methods to those defined therein.

I claim:

1. The method of repeatedly forming plastic shell type articles from a thin, generally continuous flexible sheet of plastic comprising the steps of: placing successive portions of a generally continuous sheet of plastic adjacent a die forming means one portion at a time; pressing a blade into sealing contact with each sheet portion around the periphery of said die and thereby sealing said sheet portion to said surface; heating said sheet portion and applying a pressure differential thereto to force it against said forming means and the side of said blade and thereby form a relatively rigid three dimensional configurated article in said portion; subsequently applying increased pressure to said blade to then substantially penetrate and crease said sheet portion around the periphery of said article without severing said article from said sheet; advancing said sheet portion and article in a generally linear path, while cooling said sheet and article; conducting said cooled sheet portion in a non-linear path to break at least the front edge of said relatively rigid article loose from said flexible sheet due to the difference in flexibility of the article and sheet; and introducing a separating surface between said front edge and said sheet while continuing to conduct said sheet in said non-linear path to peel said article completely from said sheet.

2. A method of repeatedly forming three dimensional shell-type plastic articles from a generally continuous, elongated web of thermoplastic material, comprising the steps of: intermittently advancing successive portions of generally continuous thermoplastic web between a die forming means and a cooperative surface, one web portion at a time; pressing a blade into sealing contact around the periphery of each web portion, against said surface; heating each said web portion when so sealed, and applying a pressure differential thereto to force said web portion against said die forming means to form a three dimensional article in said web portion; subsequently applying increased force to said blade to then substantially penetrate and crease said web portion around the periphery of said article, without severing said article from said web; simultaneously with said above step intermittently advancing successive web portions between said die forming means and surface, intermittently advancing said articles and the surrounding web from between said die forming means and surface while retaining said web and articles in the same general plane, causing them to travel in a generally planar path; cooling said articles and web to rigidify said articles and embrittle the peripheral creases; pulling said cooled web from said plane through an arcuate path, around a guide, thereby simultaneously causing the forward edge of each rigidified, three dimensional article to protrude from the web at the embrittled crease; and introducing a peeling surface between said edge and said web while continuing to pull said web around said arcuate path to peel the article completely from the web.

*3. The method of repeatedly forming plastic shell type articles from a thin, generally continuous flexible sheet of plastic comprising the steps of: placing successive portions of a generally continuous sheet of plastic adjacent a die forming means one portion at a time; heating said sheet portion and applying a force thereto to force it against said forming means and thereby form a relatively rigid three dimensional configurated article in said portion; subsequently pressing a blade against said sheet portion around the periphery of said article to substantially penetrate and crease said sheet portion around the periphery of said article without severing said article completely from said sheet; advancing said sheet portion and article in a generally linear path, while cooling said sheet and article; conducting said cooled sheet portion in a non-linear path to break at least the front edge of said relatively rigid article loose from said flexible sheet due to the difference in flexibility of the article and sheet; and introducing a separating surface between said front edge and said sheet while continuing to conduct said sheet in said non-linear path to peel said article completely from said sheet.*

*4. The method of repeatedly forming plastic shell type*

*articles from a thin, generally continuous flexible sheet of plastic comprising the steps of: sequentially forming relatively rigid, three dimensional configurated articles into successive portions of a generally continuous sheet of plastic; subsequently pressing a blade against each sheet portion around the periphery of each formed article to substantially penetrate each sheet portion without completely severing each article from its respective sheet portion; advancing said sheet portion and article in a generally linear path, while cooling said sheet and article; conducting said cooled sheet portion in a non-linear path to break at least the front edge of said relatively rigid article loose from said flexible sheet due to the difference in flexibility of the article and sheet; and introducing a separating surface between said front edge and said sheet while continuing to conduct said sheet in said non-linear path to peel said article completely from said sheet.*

References Cited

The following references, cited by the Examiner, are of record in the patented file of this patent or the original patent.

UNITED STATES PATENTS

| | | | |
|---|---|---|---|
| 1,737,874 | 12/1929 | Busch | 264—90 |
| 2,561,942 | 7/1951 | Moule. | |
| 2,663,130 | 12/1953 | Donofrio. | |
| 2,691,798 | 10/1954 | Winchester et al. | 18—19 |
| 2,765,493 | 10/1956 | Winstead | 264—90 |
| 2,926,385 | 3/1960 | Willson | 264—89 |
| 3,091,946 | 6/1963 | Kesling | 264—45 |

FOREIGN PATENTS

| | | |
|---|---|---|
| 1,122,016 | 5/1956 | France. |

ROBERT F. WHITE, *Primary Examiner.*

A. R. NOE, *Assistant Examiner.*